Patented Feb. 13, 1951

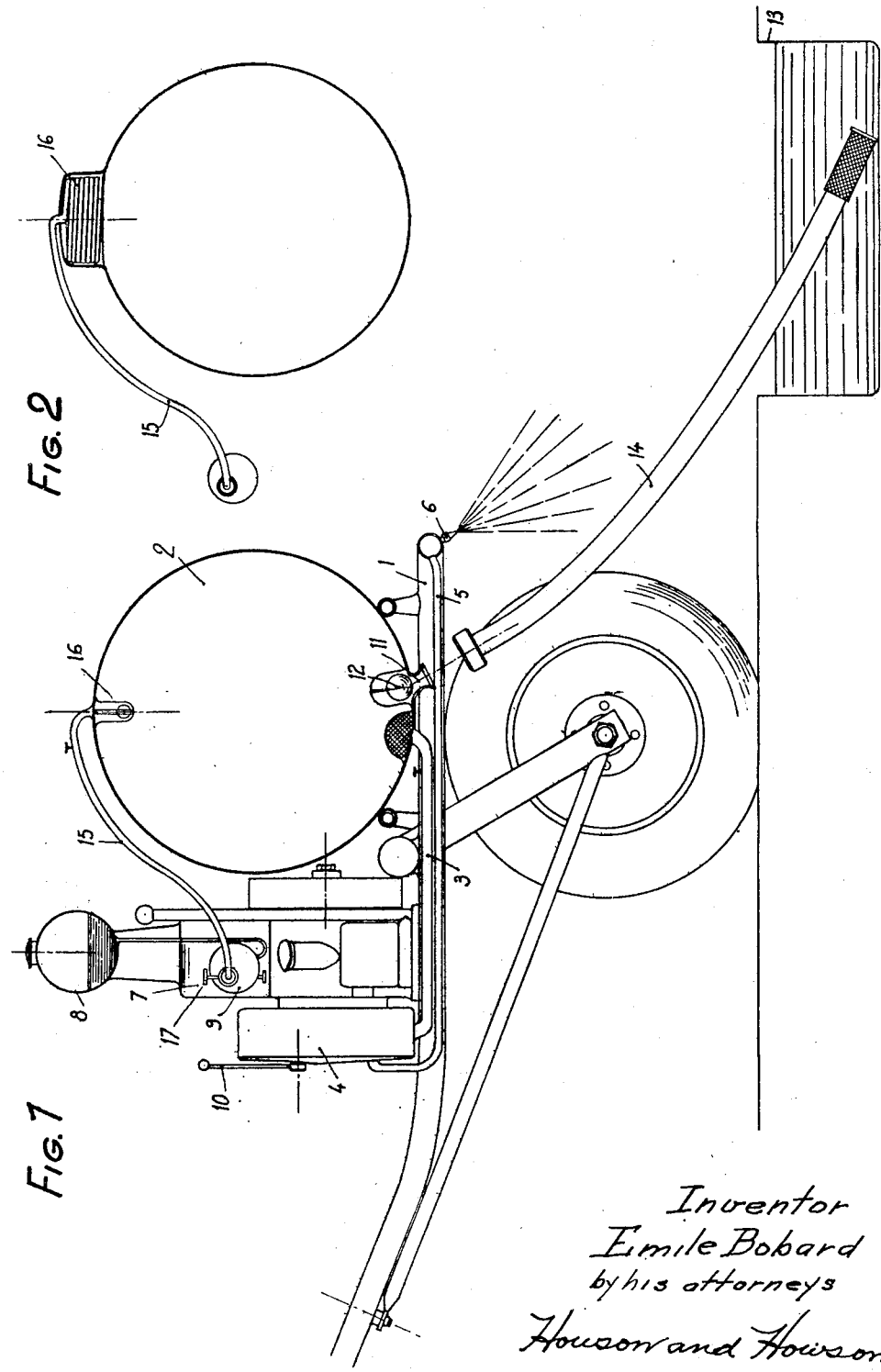

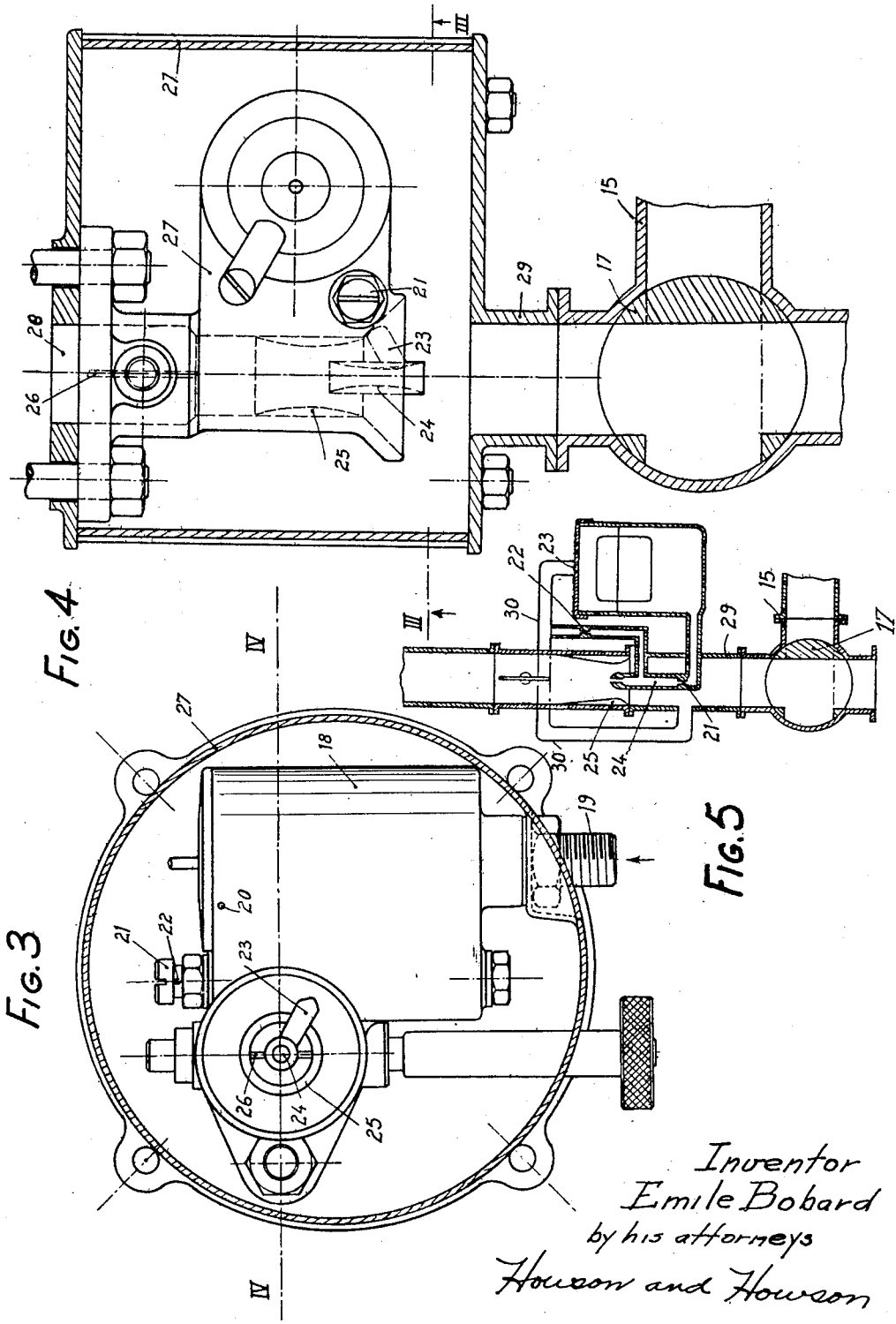

2,541,740

UNITED STATES PATENT OFFICE 2,541,740

APPARATUS FOR MAKING USE OF THE SUCTION STROKE IN INTERNAL-COMBUSTION ENGINES

Emile Bobard, Beaune, France

Application August 6, 1946, Serial No. 688,796
In France August 20, 1945

6 Claims. (Cl. 103—236)

1

The partial vacuum which always exists in the air inlet pipes of internal combustion engines having at least four cylinders has long been used for pressure reduction in various equipment such as servo-brakes, water pumps, windshield wipers on automobiles or for priming the suction pipes in centrifugal pumps used against fires, etc.

But in all these cases, the volume of low pressure air used for driving auxiliary apparatuses forms only a fraction of the cylinder capacity of the engine, so as not to modify to any substantial extent, the partial vacuum acting on the carburetter and to not misadjust substantially the operation of the latter. It has therefore not been possible heretofore, to use this partial vacuum for more important applications, such as the speedy filling through vacuum of large containers. Nor has the same idea been applied to this day with engines having only one or two cylinders in which consequently the partial vacuum in the admission pipe is discontinuous as this would require a non-return valve between the pipe through which the withdrawal of the air is operated and the inlet pipe of the engine.

Now my invention has for its object means allowing full use of the partial vacuum prevailing in said cylinders during the suction stroke for auxiliary purposes such as the filling of a reservoir. These means consist chiefly on one hand in connecting with the container, inside which a partial vacuum is to be created to cause it to fill, the usual air intake of an ordinary carburetter of the constant level vat type normally opening into the outer atmosphere and on the other hand designing this carburetter with a view to constantly maintain at its main points, to wit: the constant level vat, the nozzle tip and if required the entrance of the emulsifying air between the vat and the nozzle, the same partial vacuum as in the container so as to retain at every moment, a correct unchanging weight ratio between the gasoline and the air in the mixture sucked in.

As a matter of fact, if the air inlet pipe were merely connected with the closed chamber of the reservoir to be filled this would lead gradually, with the establishment of vacuum in said chamber, to lower the pressure ahead of the nozzles located in the air inlet pipe while atmospheric pressure would continue prevailing at the two other points of the carburetter which would have as a result to make the gasoline arrive in abnormal amounts to the nozzles i. e.

2 the carburetter would be flooded and the engine would lose almost entirely its power.

If, on the contrary, in conformity with the invention, the whole of the carburetter is submitted to the rarefied atmosphere of the chamber, the engine will operate after the manner of an aircraft engine adapted to operate at high altitudes without supercharging; in other words its power will be gradually reduced, as it is fed by a smaller amount of carburetant mixture while the ratio of the amount of air with reference to the amount of gasoline in said mixture will remain substantially normal.

This reduction in power is however a gradual one and depends on the decrease in pressure in the chamber; it shows absolutely no drawbacks in the cases already disclosed of a priming of the suction pipe of a centrifugal pump or of the filling through vacuum of containers such as those of agricultural atomisers, because, in these different cases, the full power of the engine is used only after its auxiliary operation of producing vacuum has been brought to an end, and the inlet pipe feeding air to the carburetter has been set again into communication with the atmosphere.

Accompanying drawings show by way of example only a number of forms of execution of the invention.

Figs. 1 and 2 show the manner of applying the invention to the filling of the container of an agricultural atomiser during the filling stage.

Fig. 1 is an elevational view of the whole arrangement, while Fig. 2 illustrates a modified form of execution relating to the design of the container.

Figs. 3 and 4 show at a larger scale a first form of execution of the mounting of a carburetter shown cross-sectionally respectively through line III—III of Fig. 4 and line IV—IV of Fig. 3.

Fig. 5 is a diagrammatic showing of another form of execution.

Fig. 1 shows an agricultural atomising device of the usual type on the frame 1 of which is mounted a container 2 for the liquid to be atomized, said container being connected through the pipe 3 with the pump 4 delivering the liquid through a pipe 5 towards the atomizing jets 6. This pump 4 is driven by an internal combustion engine generally of the one cylinder type including a gasoline tank 8 and a carburetter 9, said engine being disconnected with reference to the pump when required through the operation of the control lever 10.

In the bottom of the container 2, is provided moreover a port 11 controlled by a flap valve 12 for allowing its filling through a reservoir 13 at a lower level, connected with said port 11 through a pipe 14 removably fitted on said port.

According to the invention, the filling is ensured through the engine 7 itself under the following conditions:

The suction pipe feeding air to the carburetter 9 is connected with one end of a pipe 15 whose other end is connected to the upper part of the container 2 through the agency of protecting means 16 preventing the admission of liquid into the engine at the end of the filling. A cock 17 allows moreover connecting as desired the suction pipe feeding air to the carburetter either directly with the atmosphere under normal operating conditions or with the pipe 15.

As disclosed hereinabove, the very depression produced by the suction stroke of the engine produces progressively in said container 2 a vacuum which allows the liquid to rise through the pipe 14 out of the reservoir 13.

It is necessary however that the feeding of air to the carburetter at a pressure less than atmospheric pressure shall not result in misproportioning the gasoline and air. To avoid that difficulty all parts of the carburetter usually in communication with the atmosphere are connected so as to subject them all to the same pressure by putting them into communication with the container 2.

Various arrangements may be provided to this end.

In the example of Figs. 3 and 4, an ordinary carburetter has been illustrated, said carburetter comprising a constant level vat 18 fed with gasoline at 19 and communicating with the atmosphere through a port 20, a spray nozzle 21 with its admission of primary emulsifying air at 22 communicating at 23 with the venturi or diffusor 24 engaging in its turn the main air nozzle 25 which is connected with the suction pipe of the engine through the agency of the usual throttle valve 26.

According to my invention, this carburetter as a whole is enclosed inside a fluidtight casing 27 through which is operated the connection with the engine at 28 and with the atmosphere at 29. The pipe 29 serves therefore for the connection of the above mentioned pipe 15 through the agency of the cock 17. Consequently all the means connecting the carburetter with the outer atmosphere at 20, 21 and 25, are thus simultaneously submitted to the action of the reduced pressure in the container 2, as soon as the cock 17 is operated and moves from the position illustrated in solid lines to that shown in dot and dash lines.

Fig. 5 shows diagrammatically a carburetter of another type showing however also a similar nozzle 21 with its admission of emulsifying air 22, an admission of air 23 into the constant level vat and a venturi or diffusor 24 inserted in the main suction pipe 25 connected with the pipe 15.

According to my invention, the carburetter illustrated in Fig. 5 is no longer housed in a closed chamber and the ports 22 and 23 are simply connected through a duct 30 with the main suction pipe 29. In practice, the duct may be formed by channels provided in the wall of the carburetter.

In the case of an injection engine, i. e. an engine without a carburetter, the suction stroke of the engine may be used in a still simpler manner, as the depression does not misadjust the independent injection of fuel as in the case of an ordinary carburetter including a constant level vat communicating with the outer atmosphere.

The arrangement 16 mentioned with reference to Figs. 1 and 2 prevents, at the end of the filling, the admission of liquid into the carburetter and this arrangement may be constituted either by a mere float as shown in Fig. 1 or else by a preferably worm shaped extension of the pipe 15 for reducing the room taken up thereby and the cross-section of which is just sufficient for feeding the engine as long as only rarefied air passes therethrough at a high speed, said cross-section being however insufficient for the circulation of the liquid when it begins circulating therethrough by reason of the flow of liquid being far slower than that of air. The engine stops then automatically if the attendant does not immediately operate the cock 17. On the contrary as soon as the cock 17 provides direct communication with the atmosphere, the liquid which has entered the worm during the choking stage of the engine flows naturally back into the container as soon as the latter begins emptying.

What I claim is:

1. In combination with an internal combustion motor, a carburetter of the constant level vat type, a plurality of air inlets therefor including a main air inlet, an airtight casing enclosing said carburetter, an air inlet into said casing the cross-section of which inlet is at least equal to that of the main air inlet into the carburetter, said casing inlet opening into the atmosphere, a container to be emptied of air, and means for connecting the air inlet into the casing with said container and with the outer atmosphere selectively.

2. In combination with an internal combustion engine, a container to be filled with liquid, a carburetter of the constant level vat type having a main air inlet, a float chamber and atomizing means, a plurality of auxiliary air inlets including inlets to said float chamber and to said atomizing means, means to connect the auxiliary air inlets with the main air inlet for equalizing the pressure, and means for connecting said main air inlet at will with the atmosphere or with the container.

3. In combination with an internal combustion engine, a container to be filled with liquid, a carburetter of the constant level vat type having a main air inlet, a float chamber and atomizing means, a plurality of auxiliary air inlets including inlets to said float chamber and to said atomizing means, means to connect the auxiliary air inlets with the main air inlet for equalizing the pressure, means for connecting said main air inlet at will with the atmosphere or with the container, means for connecting the container with a reservoir of liquid to be sucked into said container, and means adapted to obstruct the passage of the liquid out of the container when filled into the means connecting same with the air inlet.

4. In combination with an internal combustion engine, a container to be filled with liquid, a carburetter of the constant level vat type having a main air inlet, a float chamber and atomizing means, a plurality of auxiliary air inlets including inlets to said float chamber and to said atomizing means, means to connect the auxiliary air inlets with the main air inlet for equalizing the pressure, means for connecting said main air inlet at will with the atmosphere or with the container, means for connecting the container with a reservoir of liquid to be sucked into said container, and means adapted to prevent the passage of the liquid out of the container when filled into the means connecting same with the air inlet and including a float forming a non-return valve.

5. In combination with an internal combustion engine, a container to be filled with liquid, a carburetter of the constant level vat type having a main air inlet, a float chamber and atomizing means, a plurality of auxiliary air inlets including inlets to said float chamber and to said atomizing means, means to connect the auxiliary air inlets with the main air inlet for equalizing the pressure, means for connecting said main air inlet at will with the atmosphere or with the container, means for connecting the container with a reservoir of liquid to be sucked into said container, and means adapted to obstruct the passage of the liquid out of the container when filled into the means connecting same with the air inlet and including a tube forming the end of the means connecting the air inlet with the container and the cross-section of which is such as will allow the free passage of the sucked-in air while braking considerably the circulation of the liquid.

6. In combination with an internal combustion motor, a carburetter of the constant level vat type including a spray nozzle, and a main air inlet for said carburetter, two auxiliary air inlets to supply air to the constant level vat of the carburetter and primary emulsifying air to said spray nozzle respectively, means to connect said two auxiliary air inlets with the main air inlet so that all said inlets shall be submitted to the same pressure, a container to be emptied of air, and means for selectively connecting the main air inlet with said container or with the outer atmosphere.

EMILE BOBARD.

REFERENCES CITED

The following references are of record in the file of this patent:

UNITED STATES PATENTS

| Number | Name | Date |
|---|---|---|
| 2,095,493 | Bernard | Oct. 12, 1937 |
| 2,284,166 | Pye | May 26, 1942 |